Nov. 27, 1923. 1,475,174
H. L. DECKER
ELECTRIC MEASURING INSTRUMENT
Filed Feb. 25, 1920
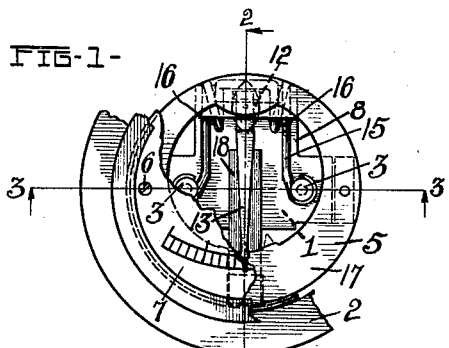
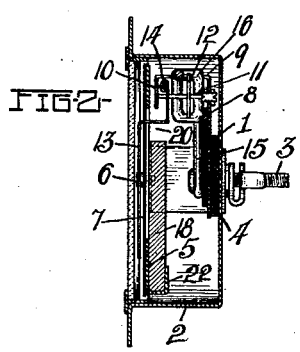
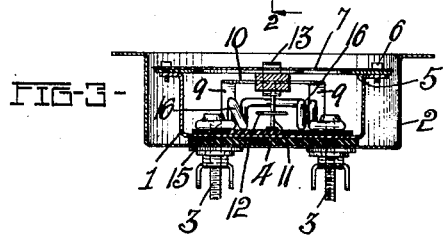
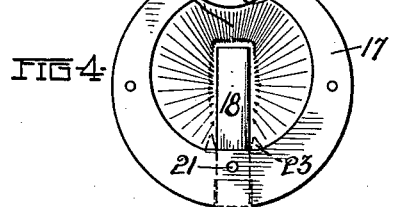
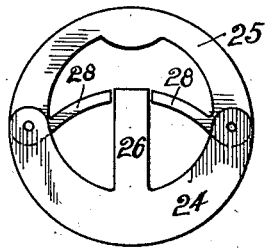
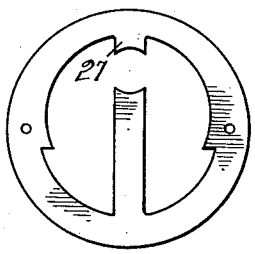
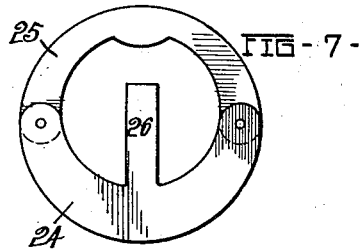
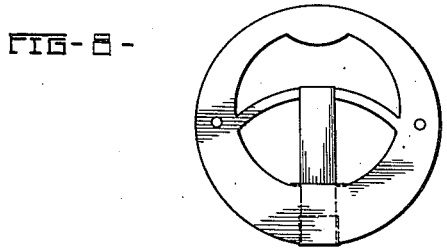
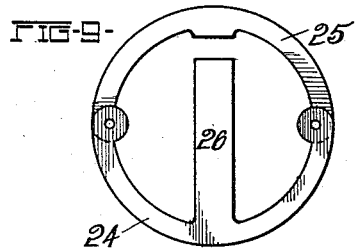
INVENTOR
Hugh L. Decker,
By Owen Owen & Crampton
His attys.

Patented Nov. 27, 1923.

1,475,174

UNITED STATES PATENT OFFICE.

HUGH L. DECKER, OF TOLEDO, OHIO, ASSIGNOR TO THE W. G. NAGEL ELECTRIC COMPANY, OF TOLEDO, OHIO, A CORPORATION OF OHIO.

ELECTRIC MEASURING INSTRUMENT.

Application filed February 25, 1920. Serial No. 361,156.

*To all whom it may concern:*

Be it known that I, HUGH L. DECKER, a citizen of the United States, and a resident of Toledo, in the county of Lucas and State of Ohio, have made an invention appertaining to Electric Measuring Instruments; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric measuring instruments, and particularly to the magnet member thereof and to the arrangement of the current carrying coils or conductors.

The primary object of this invention is the provision of an instrument of the character described which will effectually withstand the conditions obtained in rough service, and especially conditions such as exist in automobile usage. Such an instrument must be able to operate satisfactorily and without variation throughout extreme vibrations and shocks, must not be affected by external magnetic or electrical influences such as is often obtained in automobile usage, must not be affected by short circuit currents of much greater magnitude than those ordinarily passing through its windings, and in common must be able to function satisfactorily throughout extreme abuse of all descriptions.

A further object of the invention is the provision of an instrument of the class described, which is simple and inexpensive to manufacture, easy and rapid to assemble, easy and rapid to calibrate and which enables the case or mounting therefor to comprise a magnetic instead of a more expensive nonmagnetic material, as has heretofore been necessary, thereby enhancing the practicability and commercial value of such instrument.

This invention contemplates the provision and usage of a magnet of such form or construction as to have an air gap of high magnetic flux density contained within and surrounded by the magnetic material or magnetic conductor itself; to have a consequential pole resultant from the divergence of the lines of magnetomotive force along several magnetic conductors and their subsequent convergence at a point equidistant from the point of their divergence, and, by construction, adjacent to a point of opposite magnetic polarity to that of the point of their divergence.

A magnet embodying the invention may be constructed entirely of permanent magnet steel, machined or fashioned to such a shape as to achieve the results mentioned above. This shape in practice ordinarily would preferably be that of a ring with a member projecting diametrically therefrom to a point within its circumference and terminating in spaced relation thereto to provide an air gap of the desired length and density between the free end of the diametrical member and the adjacent portion of the ring member. The portions of the two members forming the extremities of the air gap may be machined or otherwise suitably fashioned to distribute the magnetic flux in the intervening gap in a manner most advantageous to the construction.

The invention also contemplates the provison of a magnet comprising two members or portions, one of permanent magnet material and the other of soft nonpermanent, magnetic conducting material, assembled and fashioned in such form as to achieve the above mentioned results. In the ordinary embodiment of this form the nonpermanent member, either alone or in conjunction with the permanent member, preferably assumes the shape of a ring with the permanent member or a pole thereof projecting into the ring and terminating in predetermined spaced relation to a portion of the magnetic member forming the opposed pole of the magnet.

While in the embodiments of the magnet above mentioned the magnets are referred to as preferably being of ring or circular form, it will be understood that they may be made of other shapes so long as the magnet is formed with an endless portion forming an opening in which one pole portion of the magnet projects so that the air gap for the passage of the magnetic flux occurs between the free end of the entrant or inwardly projecting portion and the adjacent pole forming portion of the encircling member.

In any form of the invention the entrant or inwardly projecting member or portion is magnetized so as to possess poles at its two extremities. Then, the natural course taken by a magnetic flux being that of least reluctance, the flux of the magnet would diverge along the several paths provided at its lower or outer extremity, converging again at the point equidistant from said point of divergence, which, by construction, would be adjacent to the opposite pole of the magnetized member, thereby creating a resultant or consequent pole at that point and hence endowing to the intervening air gap a high magnetic flux density completely protected and isolated from all outside magnetic and electrical influences by the encompassing portion of the magnet.

A magnet embodying the invention may be provided with a calibrating means to enable the magnetic flux density of the air gap to be easily regulated. This means may take the form of magnetic conductors of relatively small cross-section extending from the several magnetic paths inwardly toward the free pole of the magnetized member. These extensions should be bendable so as to "shunt" a predetermined flux from the consequent pole and thus vary the flux density of the air gap and obtain an adjustment of the torque of the instrument. If it is not desired to effect calibration by the adjustment of the shunt members, these members may be connected directly with the permanent magnet member, in which case they should be of relatively small predetermined cross-section so as to carry to their extreme permeance a desired magnetic flux and provide a closed path from the point of divergence or point of polarity to the point of opposite polarity, thereby preventing a demagnetization or distortion of the permanent magnet due to age or to the influence of an opposing magnetic field arising in the coil member.

This invention also contemplates calibration of the instrument by adjustment of the current carrying coil, or a part thereof, relative to the armature. To facilitate such adjustment the coil is placed in a position where it is most easily accessible for calibration, which arrangement or positioning is made possible by the form of the magnet employed.

The invention is fully described in the following specification, and while, in its broader aspect, it is capable of embodiment in numerous forms, a preferred and a few modified forms thereof are illustrated in the accompanying drawings, in which,—

Figure 1 is an outer face view of an instrument embodying the invention, with a portion of the case and dial plate broken away. Figs. 2 and 3 are sections thereof taken on the lines 2—2 and 3—3, respectively, in Fig. 1. Fig. 4 is a plan of the magnet removed from the instrument and illustrating the direction of the lines of force and the relatively greater density thereof across the air-gap. Figs. 5, 7 and 9 are modified forms of the magnet showing the ring member as comprising two sections and with the former including an adjustable shunt feature. Fig. 6 is a view of a single piece magnet entirely of permanent magnetic material. Fig. 8 is a view of a magnet similar to Fig 4, with a non-adjustable shunt between the diverging flux paths and the free pole of the magnet and differs from Fig. 5 in that the shunt fingers have contact with the free pole.

Referring to the drawings, 1 designates a frame of nonmagnetic material, which is mounted in a case 2 customarily of cylindrical form, being secured thereto, in the present instance, by terminal bolts 3, 3 and preferably insulatingly separated from the bottom of the case by an insulating strip 4. The frame 1 is of U-form and has its leg terminals turned outward to facilitate the mounting thereon and supporting of a magnet 5, which is secured to the legs by screws 6 together with a dial plate 7 that is disposed without the magnet.

The frame 1 is provided at one side with an extension 8, the outer end of which has arms 9, 9 extending upward therefrom in transversely spaced relation and then inward, being connected at their upper inner ends by a cross-bar 10.

The movable element of the instrument comprises the customary staff 11 and the vane 12, pointer 13, and balance 14 carried by the staff. The staff 11 is journaled at its ends in suitable bearings provided in the frame extension 8 and cross-bar 10, and the pointer 13 extends through an opening in the dial plate 7 and thence parallel therewith to register with the graduations thereon, as is well understood in the art.

The current conductor 15 connects the terminal posts 3, 3 at the inner side of the frame 1, being suitably insulated from the latter and is provided, in the present instance, with two sets of coils 16, 16 located at opposite sides of the vane 12 with their outer edges adjacent to the outer edge of the instrument in readily accessible position to be grasped and adjusted for calibrating, and with their axes at substantially a right angle to the gap between the poles of the magnet, as hereinafter described.

The magnet employed and in which the feature of the invention particularly resides, is preferably of ring form to conform to the case 2 and is mounted on the supporting legs of the frame 1 and in size is slightly smaller than the case to provide a space therebetween. The preferred construction of the magnet consists in providing a ring member 17 of soft nonpermanent, magnetic material and mounting a permanent bar magnet 18 thereon diametrically thereof with its free end extending inward to a point within the circumference of the ring in predetermined spaced relation to a portion 19 of the ring member, which point is equidistant in different directions from the point of connection of the bar magnet with the ring, as illustrated in Figs. 1 to 4. The bar magnet, which is of suitable magnetic material for the purpose, is magnetized to possess poles at its two extremities, and one pole, the south in the present instance, is connected in a magnetically conductive manner to the ring member. With this arrangement the flux from the south pole of the permanent magnet 18 diverges along the several paths provided therefrom by the ring 17 and these paths converge or meet at the point 19 equidistant from the point of divergence, which point by construction is adjacent to the opposite pole of the permanent magnet, thereby creating a resultant or consequent pole in the ring member at said point, indicated at 19, and endowing the intervening air-gap 20 with a high magnetic flux density which is completely protected and isolated by the surrounding ring 17 from all outside magnetic and electrical influences, such as the presence of magnetic material either in the case itself or outside the case, or of a stray magnetic field or any similar disturbance of an electrical or magnetic nature in the vicinity of the instrument.

The protecting action of the ring member 17 on the enclosed magnet member 18 is illustrated in Fig. 4, in which the active lines of force are shown as confined within the ring member and as being of greatest density at the air-gap, rather than extending out into the surrounding field as in the case, for instance, of the conventional or horseshoe magnet, wherein there is considerable leakage of magnetic flux from the poles and air-gap due to their being entirely unprotected from outside influences.

The protection afforded to poles and airgaps by the encompassing member or portion 17 of the present magnet not only materially prolongs the life of the magnet but cheapens the manufacturing cost of instruments in which it is used, by enabling the case 2 thereof to be made from magnetic material, such as iron or steel, rather than requiring it to be made from brass or other expensive nonmagnetic material, as has heretofore been customary and necessary.

The magnet members 17 and 18 may be secured together by a screw or rivet 21 or in any other suitable manner, and are prevented from relative turning movements, in the present instance, by providing the ring member with a tongue 22 at its outer edge for bending around the adjacent end of the magnet bar, and by providing the ring member at its inner edge at opposite sides of the bar with spurs 23, which are bent to engage the respective sides of the bar.

While the magnet is preferably constructed as shown in Fig. 4, it may comprise a single piece of permanent magnet material, as illustrated in Fig. 6, or it may comprise two magnet members 24 and 25 of U or other suitable form, with their leg ends connected together and with one of the members, 24, in the present case, provided with an entrant portion 26 defining the poles of the magnet, as shown in Figs. 5, 7 and 9. With these forms both members may be of permanent magnet material, or the portion of the ring member forming the consequential pole of the magnet may alone be of soft metal of low magnetic retentivity, as desired.

It will be understood that while the protective member or portion of the magnet in each case is shown as circular in form, as this, in ordinary practice, would probably be the form used, it may be of any other form affording a surrounding protecting means for the entrant portion and providing several divergent paths, which might be more than two, for the magnetic flux, which paths would converge or meet at a point equidistant from the point of divergence and in predetermined spaced relation to the opposite pole of the entrant portion from that of their divergence. It will therefore be understood that the term "ring" as used herein is not restricted to a truly ciruclar member, but contemplates any member having an encircling, encompassing or surrounding relation to the entrant pole member. It is preferable, but not necessary, with each form or construction of magnet to provide the ring at the point of its consequential pole with a slight projection 27 directed toward the adjacent pole end of the enclosed magnet member or portion.

To facilitate calibration of the magnet and to regulate the magnetic density of the air-gap the ring member may be provided at opposite sides of the circular member with extensions 28 of magnetic conductive material of relatively small cross-section projecting inward toward the free pole of the central magnetized member and bendable relative to the central member to vary the gap or space therebetween. These extensions shunt a predetermined amount of magnetic flux from the consequential pole depending on their cross-section and magnetic conductivity relative to the ring member and on the spacing of their ends from the free pole of the central magnet member, thereby facilitating an adjustment of the torque of the instrument. If desired, the extensions may be connected with the central magnet member so as to afford a permanent non-adjustable shunt or keeper from the flux paths, leading to the consequential pole, to the free pole of the central magnet member, as shown in Fig. 8. In this figure the shunt fingers are in abutment at their inner ends with the sides of the free pole piece without an interposed gap present in Fig. 5. With this construction the shunt connection should be of such relatively small predetermined cross-section that its extreme flux carrying capacity is less than that of the divergent flux paths of the magnet. The purpose of the shunt extensions is to prevent demagnetization or distortion of the permanent magnet due to age or to the influence of an opposing magnetic field arising in the coil.

The provision in an electric measuring instrument of a magnet of the form described, causes the lines of force passing across the air-gap 20 of the magnet to take a course which is substantially diametrical of the instrument, thereby rendering it possible to position the coil or coils of the current carrying conductor with their inner edges directed toward the center of the instrument and their outer edges disposed at or adjacent to the outer edge of the instrument in convenient positions to be grasped and adjusted for calibration. With the horseshoe type of magnet customarily used, the lines of force across the air-gap are tangential to a circle concentric with the instrument center rather than radial thereof, thereby necessitating positioning the coils or current carrying members in a more or less inaccessible position, as it is necessary to so relatively position the magnet pole and coils that the resultant flux from one is 90° to that from the other.

It is evident that I have provided an electric measuring instrument which is not only simple and cheap to manufacture and assemble, but is capable of being readily and accurately calibrated and is less susceptible to outside magnetic and electric influences and disturbances than magnets of the bar and horseshoe types, and is little affected by abnormal internal disturbances in the instrument caused by the passage of an abnormal current through the electric circuit or by imposing an abnormal electromotive force across the terminals of the circuit.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. A magnet having a member of permanent magnet material, and a member of nonpermanent magnet material encircling the first member, the latter member having magnetic conductive connection with one pole of the permanent member and forming a single consequential pole adjacent to the other pole of the permanent member and of opposite polarity thereto.

2. A magnet having a member of permanent magnetic material, and means, a portion at least of which is of nonpermanent magnetic material, forming a flux conductor projecting from one pole of the member in surrounding relation to the member to protect it from external magnetic and electrical influences and forming a consequential pole adjacent to the free pole of the member and of opposite polarity thereto.

3. A magnet having a member of permanent magnetic material, and means forming a plurality of flux conductors projecting from one pole of said member and forming a single consequential pole in predetermined spaced relation to the other pole of the member and of opposite polarity thereto, said conductors having a shunt connection with the member.

4. A magnet having a member of permanent magnetic material, and means forming a flux conductor projecting from one pole of said member in encircling relation to the member, and forming a single consequential pole in predetermined spaced relation to the other pole of the member and of opposite polarity thereto, said conductor having adjustable shunt connection with the member.

5. In an instrument of the class described, a current carrying element, a member susceptible of magnetic influence associated therewith, and a permanent magnet having a flux conductor projecting from one pole of the magnet in protecting relation thereto and cooperating to form a consequential pole adjacent to the other pole of the magnet and of opposite polarity thereto, the gap between said poles being adjacent to said member.

6. In an instrument of the class described, a current carrying element, a magnetic member within the influence of said element, and a magnet having a bar portion and an encircling protective portion connected to one pole of the bar portion and forming a consequential pole adjacent to the other pole of the bar portion and of opposite polarity thereto, the magnetic member being disposed within the influence of the flux passing across the gap between said poles.

7. In an instrument of the class described, a current carrying element, a magnetic member within the influence of said element, a ring of magnetic material forming a consequential pole and having an entrant permanent magnet portion terminating in a free pole in predetermined spaced relation to the consequential pole of the ring and adjacent to said member.

8. In an instrument of the class described, a current conductor, a magnetic member within the influence of said conductor, a permanent bar magnet longitudinally aligned with said member, and a ring flux conductor connected to the pole of said magnet remote from said member and embracing the magnet, said ring forming a consequential pole in predetermined spaced relation to the free pole of the magnet with the gap therebetween adjacent to said member.

9. In an instrument of the class described, a current conductor, a vane associated therewith, a permanent magnet bar having a free pole adjacent to said conductor and vane, and a flux conductor projecting from the opposite pole of said bar in embracing relation to the bar in shunt connection therewith and cooperating to form a consequential pole in predetermined spaced relation to the free pole of the bar and of opposite polarity thereto.

10. In an instrument of the class described, a current conductor, a vane associated therewith, a permanent magnet bar having a free pole adjacent to said conductor and vane, a flux conductor projecting from the other pole of said bar in cooperative embracing relation to the bar and forming a common consequential pole without the free pole of said bar in predetermined spaced relation thereto, said conductor having shunt connections of relatively small cross section projecting toward the free pole of the bar and bendable to vary the gap therebetween.

11. In an instrument of the class described, a movable vane, a magnet having its air-gap disposed adjacent to the vane and in a plane therewith substantially diametrical of the instrument, and a current conductor having a coil disposed at a side of the vane with its axis substantially at a right angle to the diametrical plane of the gap.

12. In an instrument of the class described, a movable vane, a magnet having its air-gap exposed adjacent to the vane and in a plane therewith substantially diametrical of the instrument, and a current conductor having coils disposed at opposite sides of the vane with the axis thereof at substantially a right angle to the diametrical plane of the gap.

13. In a circular instrument of the class described, a movable vane, a magnet having its air-gap disposed adjacent to the vane and in substantially a diametrical line of the instrument, and a current conductor having coils at opposite sides of the vane with the coil axis at right angles to the diametrical line of the gap and with their outer edges adjacent to the outer edges of the instrument in accessible position for calibration.

In testimony whereof I have hereunto signed my name to this specification.

HUGH L. DECKER.